Figure 1:
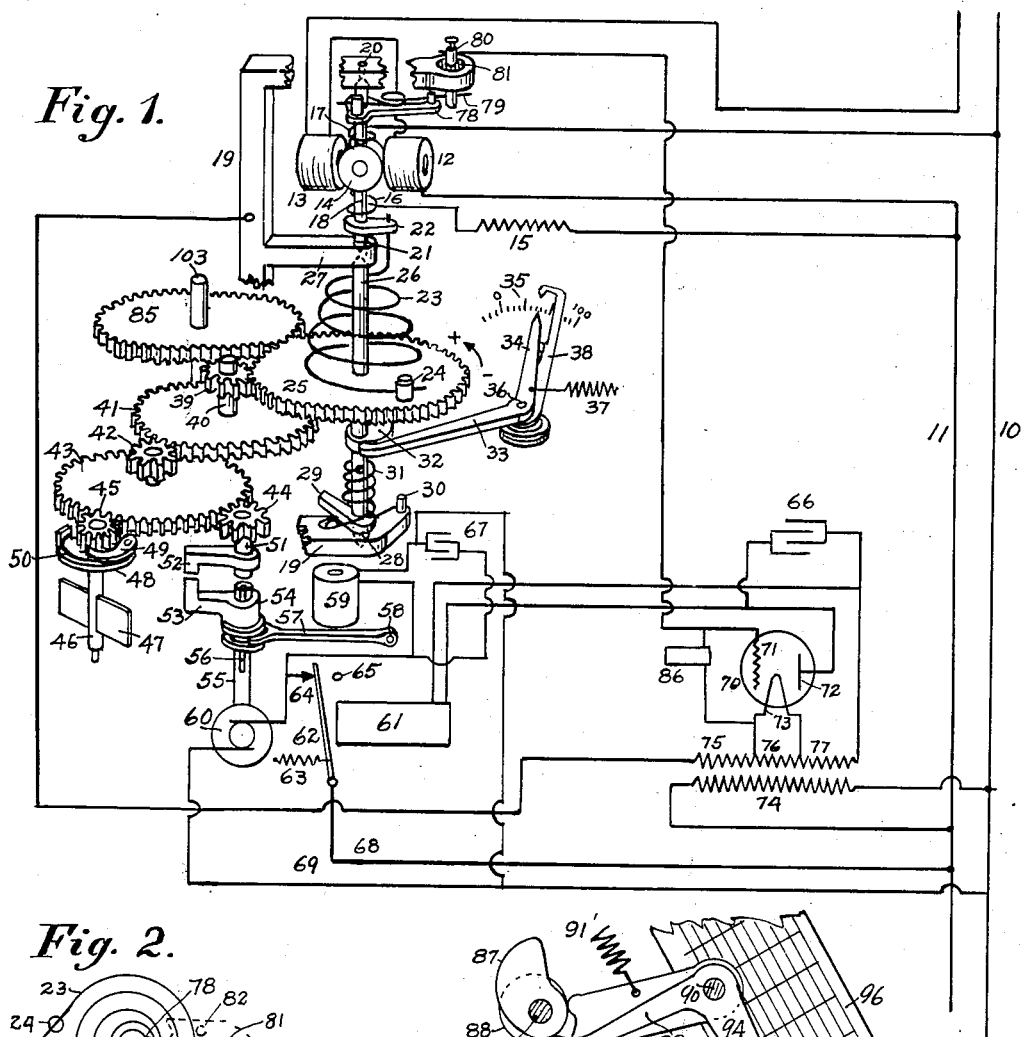

Jan. 29, 1935.  A. F. POOLE  1,989,606
ELECTRIC METER
Filed Jan. 25, 1933  3 Sheets-Sheet 1

INVENTOR.
Arthur F. Poole.

Jan. 29, 1935.  A. F. POOLE  1,989,606
ELECTRIC METER
Filed Jan. 25, 1933  3 Sheets-Sheet 2

INVENTOR.
Arthur F. Poole

Jan. 29, 1935.   A. F. POOLE   1,989,606
ELECTRIC METER
Filed Jan. 25, 1933   3 Sheets-Sheet 3

INVENTOR.
Arthur F. Poole.

Patented Jan. 29, 1935

1,989,606

UNITED STATES PATENT OFFICE 1,989,606

ELECTRIC METER

Arthur F. Poole, Ithaca, N. Y.; Maryline B. Poole administratrix of said Arthur F. Poole, deceased Application January 25, 1933, Serial No. 653,427

7 Claims. (Cl. 171—34)

My invention is a meter of the relay type, that is to say, a meter in which there is a movable element (hereinafter called the armature) responsive to the force exerted by the quantity to be measured. When the force varies, the armature is deflected a small amount from its normal position against a restoring force and thereby, by closing an electric contact or other equivalent means, sets into action mechanism which alters the restoring force so as to bring the armature back to its normal position. Thus the armature is automatically kept in its normal position and the magnitude of the restoring force is a measure of the quantity to be measured. Meters of this type have the advantage that the forces deflecting the armature may be very small, all the work of moving indicating hands, pens integrating mechanism or the like, is done by the mechanism which restores the armature to its normal position. As a counterbalancing disadvantage there is the fact that the indications of a relay meter lag, that is, the indication occurs after the quantity being metered has changed.

One of the objects of my invention is to improve the contact making mechanism of a meter of this type by the use of a triode and associated circuits. By this expedient a resistance of the order of a megohm may be put in the contact circuit without harm to the operation thereof. Another advantage resulting from the use of a triode is that current made and broken at the armature contact is of the order of a few microamperes and entirely too minute to make trouble from sparking with the accompanying deterioration of the contacts. A further object of my invention is in the improved mechanism to restore the armature after displacement. A further object is mechanism connecting an indicating hand to a meter of this type, and further extending this mechanism so as to move a pen making record on a sheet for the purpose of a graphic meter. Another object of my invention is a novel straight line device for the pen so that it will be moved by the meter in a line at right angles to the motion of the record sheet. Another object of my invention is in novel means to integrate the readings of a relay meter thereby providing an integrating meter, and further in the provision of means to integrate the meter indications accumulated at the time of an interruption of the current, or alternatively, to preserve these indications to be integrated when current is resumed. Another object of my invention is in the novel integrating mechanism used, and also in the use of a clock equipped with a carry over to control said integrator to the end of integrating any meter indication present when the line current is interrupted. A further object of my invention is a mechanism for controlling the integrating device of the meter from a regulated alternating current to the end that the well known time keeping qualities of a regulated current may be used to advantage to insure accurate integration.

The above and other objects of my invention will be apparent to those skilled in the art from the following specification and claims as they are set forth therein.

Figure 2:
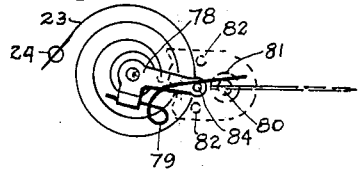
Figure 4:
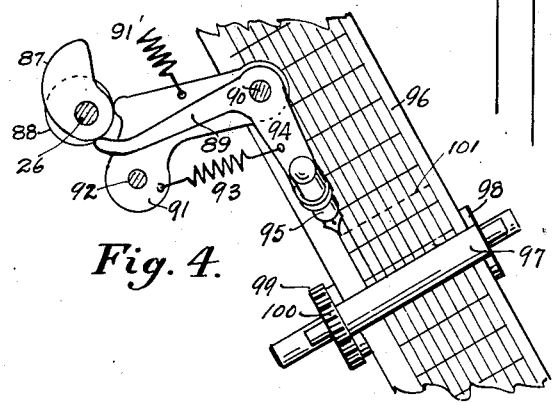
Figure 3:
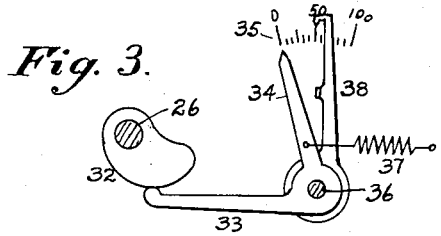
Figure 5:
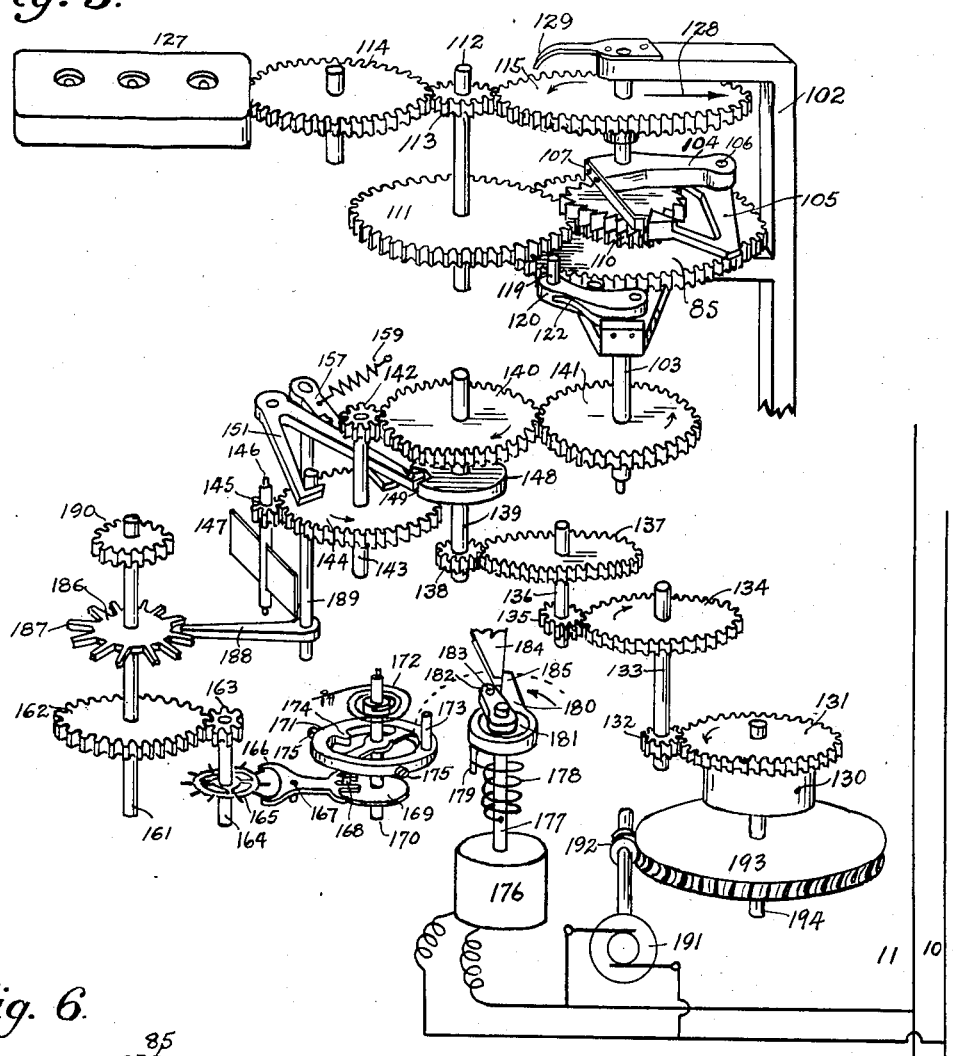
Figure 6:
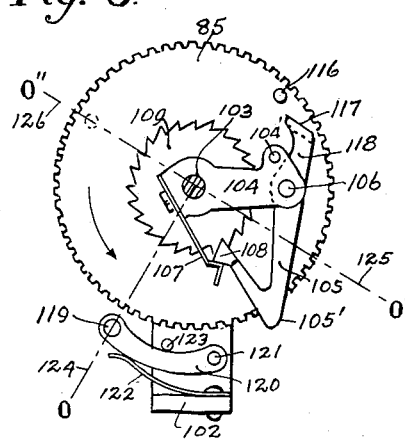

My invention may be best understood by reference to the drawings of which Fig. 1 is a diagrammatic view of the relay meter, Fig. 2 a detail of the contact mechanism, Fig. 3 a detail of the hand indicating mechanism, and Fig. 4 a diagram of my device used as a graphic meter. Fig. 5 is a diagram of an integrating meter, Fig. 6 a detail of the integrating mechanism, Fig. 7 a detail of the clock release for the integrating motor, and Fig. 8 an alternative plan for driving the integrator from a synchronous motor and having a means to preserve any meter indication remaining at the cutting off of the current, to be integrated when the circuit is resumed. Fig. 9 is a circuit diagram of the coil connections when the meter is used as a voltmeter or ammeter instead of the wattmeter shown in the previous figures. The same reference numbers identify like parts in all the figures.

Referring now to Figs. 1, 2, and 3 in which I have shown an example of my improved device as applied to a wattmeter, 10 and 11 are line wires carrying an alternating current which is preferably regulated to send out a given number of alternations per hour. To the line wires are connected field coils 12 and 13 in series with one side of the line so that the current through these coils is, in magnitude and phase, proportional to the amperes in the line current. A voltage or armature coil 14 is connected across the line wires 10 and 11 in series with a resistance 15. Light flexible lead wires 17 and 18 serve to lead the current to the coil 14. The coil 14 is mounted on a shaft 18 turning in the frame 19 in suitable bearings 20 and 21. As is well known, the torque on the coil 14 from the field coils 12 and 13 is proportional to the watts, and this takes into account the phase of the voltage and series current. The entire system of the shaft 18 and the parts mounted thereon is made as light as possible.

A counter torque for the shaft 18, to oppose that of the current, is transmitted through an arm 22 rigid on the shaft 18 and in which is secured a control spring 23 whose other end is fastened in a stud 24 in a wheel 25 on a shaft 26 turning in an arm 27 on the framework 19 and in the bearing 28 in the same framework. An arm 29 on the shaft 26 cooperates with a stop 30 in the framework 19 and limits the extent of rotation of the shaft 26 to less than 360 degrees. The shaft 26 is given a torque to rotate in a direction opposite to the arrow to the right of the wheel 25 by a spring 31 which is much stronger than the spring 23. One end of the spring 31 is fastened to the shaft 26 and the other to the framework 19. The shaft 26 also carries a cam 32 cooperating with which is a tail 33 of a hand 34 moving over a scale 35 and turning on a pivot 36 in the framework 19. A spring 37 holds the tail 33 to the cam 32 compelling said tail to follow the contour of said cam. The position of the hand 34 will therefore indicate the angle of rotation of the shaft 26 and consequently that of the wheel 25 rigid thereto. A second hand 38 is frictionally mounted on the pivot 36 and contacts with the hand 34 and is pushed by said hand as 34 turns in a clockwise direction. The hand 38 remains at the highest point to which it has been moved and thus serves as a maximum demand hand or indicator.

The spring 31 gives the wheel 25 a torque in a counter clockwise direction, the consequent rotation is regulated by a gear train ending in a fan fly. The wheel 25 turns a pinion 39 on a shaft 40 on which is a wheel 41 driving a pinion 42 on a wheel 43 turning in the framework. The wheel 43 drives a pinion 44 and a pinion 45. The pinion 45 is rotatably mounted on a shaft 46 having a fanfly 47 thereon and also a disc 48 on which is a pawl 49 held in contact with the pinion 45 by a spring 50. Motion of the pinion 45 from a clockwise rotation of the wheel 25 will turn the fanfly 47. Motion of the wheel 25 in a counter clockwise direction, or in the direction of the arrow will not result in rotation of the fanfly; the pawl 49 will slip over the pinion 45 in this case.

The wheel 25 is given a rotation in the direction of the arrow by a small motor 60 as follows. The pinion 44 is on a shaft 51 which also carries one arm 52 of a clutch. The cooperating arm 53 is on a collar 54 sliding on a shaft 55 and prevented from rotating relative thereto by a keyway 56 in said shaft. A fork 57 turning on a pivot 58 lifts the arm 53 in engagement with 52 when a magnet 59 is excited. The motor 60 is normally at rest; when, as will afterwards be described, the motor 60 is to turn it is controlled by a magnet 61 having an armature 62 drawn by a spring 63 to a contact 64. A stop 65 limits the motion of the armature 62 when it is drawn up by the magnet 61. The line wire 10 is connected to the motor 60 by a conductor 69 and the armature 62 is connected to the line wire 11 by a conductor 68. The magnet 59 is connected to the line wire 69. When the armature 62 is in contact with 64 the motor will be given current and will run, also the magnet 59 will draw up the clutch fork 57 and the motor 60 will, by the train of gears connecting the pinion 44 with the wheel 25 turn said wheel in the direction of the arrow. When the magnet 61 is excited, by means afterwards to be described, the armature 62 will be drawn up, the magnet 59 deenergized with the consequent disconnection of the clutch arms 52 and 53, the motor 60 will stop, and the wheel 25 will start to turn in a clockwise direction at a speed governed by the fanfly 47. I will now describe the means by which the magnet 61 is controlled by the position of the armature coil 14.

The magnet 61 is in the plate circuit of a triode 70 having a grid 71, a plate 72, and a cathode or filament 73. A transformer having a primary coil 74 connected to the line wires 11 and 10 has a secondary coil 75 to furnish a negative bias for the grid 71, a coil 76 to give heating current for the filament, and a coil 77 to give plate current. The magnet 61 is in the plate circuit of the tube, as long as a negative bias is on the grid no current flows and the magnet 61 is not excited. The grid circuit is controlled by a contact operated by the shaft 18 on which is the armature coil. An arm 78 (see Fig. 2) on said shaft carries a light spring 79 a few thousandths of an inch in diameter which is adapted to make contact with an insulated pin 80 in an insulating washer 81 in the framework 19 and connected to the grid 71. The coil 75 is connected to the framework 19 as shown. When the spring wire 79 is in contact with the pin 80 plate current is blocked, the magnet 61 allows the armature 62 to fall to the contact 64 and start the motor 60, the magnet 59 engages the clutch members 53 and 52, and the wheel 25 starts to turn in the direction of the arrow increasing the tension of the spring 23 until said tension is greater than the force exerted by the field coils 12 and 13 on the armature coil 14. At this point the shaft 18 is turned in a counter clockwise direction, the contact at the pin 80 is opened, the bias is removed from the grid, plate current flows through the magnet 61 stopping the motor 60 and disengaging the clutch members 52 and 53 and the wheel 25 starts to turn in a clockwise direction under the torque of the spring 31. As soon as the torque of the spring 23 is reduced below the torque of the current, contact of the spring 79 is made again with 80 and the cycle is repeated. Thus the shaft 18 will continually be teetering to find a position of equilibrium and the hand 34 will give an indication of the watts in the circuit. Stop pins 82 are provided to limit the motion of the arm 78 (Fig. 2) and a pin 84 is provided in the arm 78 to form a resting place for the spring 79 so it will not be floating in the air. A condenser 67 is provided to keep the magnet 59 from chattering and a condenser 66 is provided in shunt with the magnet 61 for a similar purpose. The armature of these magnets may be sluggish instead of using the condensers for the same end if desired. A grid leak 86 is connected between the grid and cathode of the triode 70.

This completes the description of the relay meter. I will now describe some of the applications of it. In Fig. 4 is shown a graphic meter. As before noted, the shaft 26 of Fig. 1 will have a displacement from its zero position proportional to the watts dissipated in the circuit. The indicating hand of Fig. 1 may be replaced by the graphic arrangement of Fig. 4. Reference thereto will show that the shaft 26 has thereon a cam 87 and a cam 88. The cam 87 moves a tail 89 of an arm 94 pivoted at 90 on an arm 91 turning on a shaft 92 in the framework. A spring 93 is connected between the arms 91 and 94 and a spring 91' holds the arm 91 in contact with the cam 88. A pen 95 is mounted in the arm 94 and makes a line on the paper 96 which is advanced by rollers 97 and 98 geared together by the gears 99 and 100. If the cam 88 were a circle the pen 95 would draw on the paper 96, circular arcs having their center at 90; however the cam 88 is so shaped to compensate for this curvature and make the pen 95 draw the straight line 101 on the paper 96, thus giving a record in rectangular coordinates. The rollers 97 or 98 may be driven in any suitable manner to give an advance of the paper proportional to the elapsed time.

In Fig. 5 I have shown an integrating device controlled by my improved meter thus providing an integrating wattmeter. The general plan of the integrator is as follows. As before described, displacement of the wheel 25 from its zero position is proportional to the watts dissipated in the circuit. I transfer the displacement of the wheel 25 to a second wheel, for convenience of description. I provide a source of power, preferably a spring motor. Periodically the motor is released by a clock mechanism and an arm driven by the motor makes one revolution. There is an integrating train driven by a ratchet wheel, a pawl on the arm engages the ratchet wheel and drives it until the arm has turned an angle proportional to the displacement of the wheel 25 from zero. The pawl is then disengaged from the ratchet wheel which comes to rest, and the integrating train has been advanced an amount proportional to the displacement of the wheel 25. Obviously repeated operations of the arm will integrate the displacement of the wheel 25, that is, the watts registered by the meter. It is an integration by repeated movements proportional to the watts dissipated at the time of each movement. In Fig. 1 a wheel 85 is geared to the wheel 25 and is loose on a shaft 103. Now refer to Fig. 5 and we see the shaft 103 turning in a framework 102 (this may be the same as 19; in the drawings they have been separated for clearness of description). An arm 104 is rigid on the shaft 103 and has mounted thereon a pawl 105 on a stud 106 in said arm. A snap spring 107 acting on the nose 108 of the pawl 105, holds said pawl to a ratchet wheel 109 (Fig. 6) turning on the shaft 103, on the one hand, or in contact with a stop 104' on the other. The ratchet wheel 109, which preferably has fine teeth, has rigid therewith a gear 110 meshing into a gear 111 on a shaft 112 and having a pinion 113 which drives a gear 114 which, in turn, drives an ordinary integrating train 127. Rotation, therefore, of the ratchet 109, will result in advancing the integrating train 127.

At each revolution of the arm 104 the pawl 105 is thrown into the ratchet 109 by a pin 119 acting on a nose 105' of the pawl 105 as said pawl passes the zero line 124. The ratchet wheel thereupon starts to move with the arm 104 until a tail 118 of the pawl 105 having a downwardly (Fig. 6) projecting ear 117 strikes a pin 116 mounted in the wheel 85 when the pawl 105 is thrown from the wheel 109 which thereupon stops. It is to be remembered that displacement of the pin 116 from its zero line 125 is proportional to the watts indicated by the meter at that time. Consequently at each revolution of the arm 104 the integrator 127 is advanced proportional to the meter indicated watts.

It may happen that when the pin 116 is at zero there will be a conflict between the pin 119 striving to engage the pawl 105 and the pin 116 striving to disengage it. For such an interference I have mounted the pin 119 on an arm 120 turning on a stud 121 in the framework 102 and held by a spring 122 to a stop 123. In case of an interference as just noted the pin 119 yields and the pawl 105 is not thrown in, which it should not be, for the meter is at zero.

The wheel 85 is so proportioned to the wheel 25 that the former turns 180 degrees from zero (125) to the line 126 for a full scale deflection of the wheels 25, which wheel 25 may be so planned as to turn 360 degrees for a full scale deflection. For the sake of clearness I have shown the wheels 25 and 85 of approximately the same size in the drawings.

To be of assistance in calibrating the integrator I have provided a wheel 115 turning on the shaft 103 and driven by the pinion 112. A mark 128 on this wheel passing under a pointer 129 gives a means to keep track of the amount stored in the integrator 127 during a given time.

The shaft 103 is periodically driven one revolution by a spring motor whose construction will be apparent from Fig. 5. A main spring is fastened to a barrel 130 on which is a wheel 131 driving a pinion 132 on a shaft 133 on which is a wheel 134 driving a pinion 135 on a shaft 136 having thereon a wheel 137. Said wheel drives a pinion 138 on a shaft 139 having a wheel 140 thereon which drives a wheel 141 fast to the shaft 103. The speed of the motor is regulated by having the wheel 140 drive a pinion 142 on a shaft 143 on which is a wheel 144 driving a pinion 145 on a shaft 146 which carries a fanfly 147.

Figure 7:
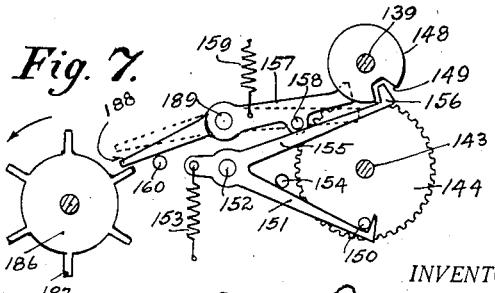

The spring motor is held normally locked by a pin 150 in the wheel 144 being locked by an arm 151 (Fig. 7). The release mechanism is like that of a striking clock. A cam 148 on the shaft 139 has a notch 149 into which falls the arm 156 rigid with 151 and turning on a shaft 152 and drawn by a spring 153 into the patch of the pin 150 when the notch 149 permits. A lever 157 turning on a shaft 189 has a pin 158 engaging the arm 155 and is held by a spring 159 against a stop 160 in the framework. When the lever 157 is moved to its dotted position (Fig. 7) the pin 150 is released and the wheel 144 turns half a turn until the pin 150 is stopped by the lever 157. The feeler 156 is now on the surface of the cam 148 holding the arm 151 from the path of the pin 150. When the lever 157 is returned to its full position by the spring 159, the wheel 144 is released and the wheel 140 turns a full revolution until the notch 149 in the cam 148 is reached which permits the lever 151 to enter the path of the pin 150 and stop the motor.

From the foregoing it is clear that a reciprocation of the lever 157 will result in a revolution of the shaft 103 and consequent integration of the position of the wheel 25.

To act on the lever 157 periodically, I provide a clock movement of which only the escapement and two of the wheels are shown. This clock is like the one shown in my issued Patent 1,328,247 of 1920 to which reference may be had. The shaft 161 in Fig. 5 is the shaft on which is the fourth wheel and revolves once a minute. The shaft 161 has a fourth wheel 162 mounted thereon driving a pinion 163 on a shaft 164 which carries the scape wheel 165 driving the pallets 166 on a shaft 167. There is the usual roller 168 on a table 169 on a balance staff 170. A balance 171 is mounted on the staff 170 on which is a hairspring 172. The clock may be electrically wound, as that in my patent referred to, and further, may be kept in synchronism with the alternating current by means of a pin 173 mounted in the balance 171 which has a counterweight 174 for the pin and also timing screws 175. There is a selfstarting synchronous motor 176 which has in it a gear box so as to reduce the motion of a shaft 177 to 120 R. P. M., the period of the balance 171. A spring 178 leads from the shaft 177 to a pin 179 on an arm 180 turning on an eccentric 181 rigid on the shaft 177. An arm 182 is rigid to the shaft 177 and carries a pin 183 therein to form a stop for the arm 180. A stop 184 on the frame work temporarily detains a nose 185 on the arm 180 during about 120 degrees of motion of the shaft 177. At each revolution of the shaft the arm 180 is held by the stop 184. The shaft 177 however continues on its way until the position of the eccentric releases the arm 180 from the stop 184 and the arm 180 then snaps under the tension of the spring 178 until it is stopped by the pin 183. The next revolution the same cycle is repeated. Now the arc of the arm 180 intersects the arc of the pin 173. When the arm 180 is snapped there are three possible positions of the pin 173.

First. The arm 180 does not hit the pin 173. In this event nothing happens.

Second. The arm 180 hits the pin 173 when said pin is going in the same direction as the arm. In this case the balance is slow and is accelerated.

Third. The arm 180 hits the pin 173 when the pin is going in the opposite direction from the arm. In this event the balance is fast and is retarded. The balance will thus be compelled to keep in step with the arm 180 which, since it is driven from a synchronous motor, will be kept in step with the current.

Further in the event the current goes off and the clock stops from the spring thereof running down, the arm 180 will start the balance as soon as current comes on. It is to be noted that the arm 180 never remains in the arc of the pin 173, it simply snaps through said arc.

Having described the clock and how it may be kept in synchronism with the current, the tail 188 on the shaft 189 is released by a wheel 186 on the shaft 161 having spokes 187 which periodically tilt the lever 157 resulting in a revolution of the shaft 103 and consequent integration. A pinion 190 on the shaft 161 serves to transmit the power of the clock mainspring (not shown; see my patent referred to) to the escapement.

The integration motor may be electrically wound by a motor 191 connected to the lines 10 and 11 and through a worm 192 turning a wheel 193 on a shaft 194 to which is attached the inside end of the mainspring in the barrel 130. A slip connection is provided, as in my patent supra, to prevent overwind.

The plan of running the integrator from a spring motor having stored power and periodically released from a clock kept in step with a regulated current has the function that in the case of an interruption of current the integration continues until the meter has reached zero and the lagging deflection of the meter is not lost. Further the use of a clock kept in step with the alternating current gives an accurate timepiece, making for accurate integration of the meter.

Figure 8:
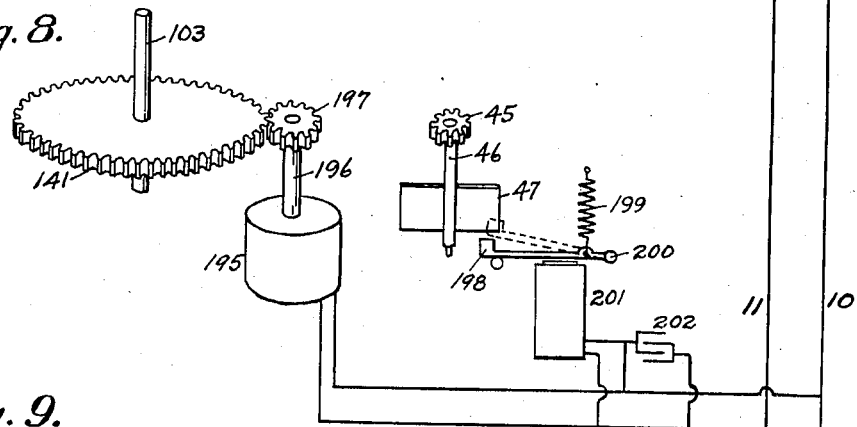
Figure 9:
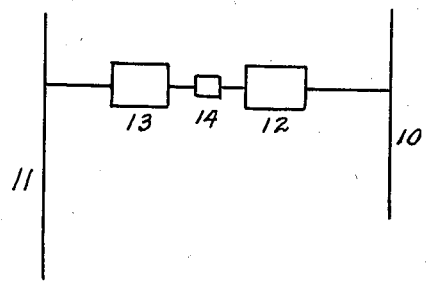

An alternative scheme is shown in Fig. 8 in which the spring motor and clock to release it intermittently are replaced by a synchronous motor 195 running all the time and driving the gear 141 on the shaft 103 by a pinion 197 on the shaft 196 of the motor 195. In this arrangement any displacement of the wheel 25 when the current went off would be lost. To preserve this deflection I have provided a detent 198 drawn by a spring 199 into the fanfly 47, which it will be remembered governs the return of the wheel 25 to zero. The detent 198 is pivoted at 200 and held to a stop by a magnet 201 connected to the line wires 10 and 11. A condenser 202 prevents chatter. So long as the line current is on, things go on as described, if the current goes off any deflection of the wheel 25 is preserved to be integrated when the current comes on again.

As previously noted, relay meters have a lag in their indications and it may be asked if the integrating plan of the mechanism described herein is accurate. The answer is that while the lag is there, positive and negative errors balance themselves out on most commercial circuits. While the meter lags on an ascending current it also lags on a descending one, and the net result is more accurate than the indication of an integrating meter with a revolving disc in a rotary magnetic field. In the dynamometer system of measuring current used herein the force on the armature coil is rigorously equal to the watts regardless of the phase angle between the volts and amperes. The moving coil may be made very light since the work to close the light contact to put a bias on the triode is practically nil.

On a circuit in which there are large and quick variations correct indication simply resolves itself into increasing the speed of the shaft 103. To take an extreme case, if this shaft rotated at an infinite speed the integrations would be correct. If the speed of the shaft 26 is increased the lag of the indications becomes less. The speed to be used is of course a compromise between excessive speed and no lag on the one hand and slow speed with consequent lag on the other. The best value to give the various factors is to be determined by those skilled in the art from the requirements of the conditions under which the meter is to be used. I have shown no dampening on the shaft 26; if the current varies widely a conducting disc in a magnetic field may be used, again whether it is worth the trouble is to be determined from a particular case.

I have shown and described my improved meter as used as a wattmeter. Fig. 9 shows the well known connections for the coils as a volt or ammeter. This arrangement needs no further description, in this event the deflection is as the square of the current or voltage, and if a uniform scale is desired the cam 32 or cams 87 and 88 are to be shaped accordingly. The integrating device is of no use for the volt or ampere meter arrangement except to the rare person who is curious as to the sum of the squares of the volts or amperes.

Many changes and modifications may be made in the precise structure herein shown without departing from the spirit of my invention, since I claim:

1. In combination, an armature coil, a field coil to exert a torque thereon, said armature coil being movable relative to said field coil, means to exert a counter torque on said armature coil, a triode to determine when said means to exert a counter torque shall be effective, and means operated by said armature coil to determine when said triode shall be effective.

2. In combination, an armature coil, a field coil to exert a torque thereon, said armature coil being movable relative to said field coil, means to exert a counter torque on said armature coil, a triode to determine when said means to exert a counter torque shall be effective, and a contact device operated by said armature coil to determine when said triode shall be effective.

3. In combination, a movable armature coil, a field coil adapted to exert a torque thereon, a spring to exert a counter torque on said armature coil, a triode having a grid and a plate circuit, a contact operated by said armature coil in said grid circuit, and means in said plate circuit to control the tension of said spring.

4. In combination, a movable armature coil, a field coil adapted to exert a torque thereon, a spring having one end connected to said armature coil, means to move the other end of said spring, a triode having a grid and plate circuit, a contact in said plate circuit operated by said armature coil, means to move said spring moving means and a magnet in the plate circuit of said triode to control said last mentioned means.

5. In combination, a pair of line wires, a field coil and an armature coil, one of said coils being connected in series with one of said line wires and the other of said coils being connected across said line wires, one of said coils being also movable relative to the other, a spring to hold one of said coils in a normal position, a triode having a grid and a plate circuit, a contact in said grid circuit operated by one of said coils, and means in the plate circuit of said triode to control said spring.

6. In combination, a field coil, an armature coil in the magnetic field of said field coil, a spring to exert a torque on said armature coil, a second spring to change the tension of said first spring in one direction, a motor to change the tension of said first mentioned spring in the reverse direction, a triode to determine when said motor shall change the tension of said spring and a contact device operated by the position of said armature coil to determine when said triode shall be effective on said motor.

7. In combination, a field coil, an armature coil in the magnetic field of said field coil, a spring to exert a torque on said armature coil, a second spring to change the tension of said first spring in one direction, a motor to change the tension of said first mentioned spring in the reverse direction, a triode to determine when said motor shall change the tension of said spring, a contact device operated by the position of said armature coil to determine when said triode shall be effective on said motor, and an indicating hand to indicate the tension of said first spring.

ARTHUR F. POOLE.